US010443544B2

(12) United States Patent
Vaisman et al.

(10) Patent No.: US 10,443,544 B2
(45) Date of Patent: Oct. 15, 2019

(54) GAS TURBINE ENGINE DRIVEN BY SCO2 CYCLE WITH ADVANCED HEAT REJECTION

(71) Applicant: Rolls-Royce Corporation, Indianapolis, IN (US)

(72) Inventors: Igor Vaisman, Carmel, IN (US); Thomas E. Bastnagel, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 136 days.

(21) Appl. No.: 15/177,874

(22) Filed: Jun. 9, 2016

(65) Prior Publication Data

US 2017/0058834 A1  Mar. 2, 2017

Related U.S. Application Data

(60) Provisional application No. 62/175,742, filed on Jun. 15, 2015.

(51) Int. Cl.
| | |
|---|---|
| *F02C 1/10* | (2006.01) |
| *F02K 3/077* | (2006.01) |
| *F02K 3/06* | (2006.01) |
| *F01K 25/10* | (2006.01) |
| *F02C 3/04* | (2006.01) |

(52) U.S. Cl.
CPC ............... *F02K 3/077* (2013.01); *F02C 1/10* (2013.01); *F02K 3/06* (2013.01); *F01K 25/103* (2013.01); *F02C 3/04* (2013.01); *F05D 2210/10* (2013.01); *F05D 2220/324* (2013.01); *F05D 2260/20* (2013.01); *F05D 2260/213* (2013.01); *Y02T 50/675* (2013.01)

(58) Field of Classification Search
CPC .......... F02K 3/077; F02K 3/115; F02K 3/105; F02C 7/10; F02C 1/10; F02C 3/34; F02C 1/06; F02C 7/08; F02C 7/141; F02C 7/18
See application file for complete search history.

(56) References Cited

U.S. PATENT DOCUMENTS

| | | | |
|---|---|---|---|
| 3,886,737 A * | 6/1975 | Grieb ...................... | F02K 3/077 181/220 |
| 3,971,211 A | 7/1976 | Wethe et al. | |
| 4,528,811 A * | 7/1985 | Stahl ...................... | F01K 23/064 60/39.52 |

(Continued)

*Primary Examiner* — Steven M Sutherland
*Assistant Examiner* — James P McGlynn
(74) *Attorney, Agent, or Firm* — Fishman Stewart PLLC

(57) ABSTRACT

A gas turbine engine includes a shaft comprising a first compressor, a fan assembly, and a power circuit that provides power to the shaft in a closed-loop system. An inner housing houses at least a portion of the shaft, the first compressor for compressing a core stream of air, and a combustor. A baffle encloses a portion of the inner housing and forms a first air passageway therebetween. A nacelle encloses a portion of the baffle and forms a second air passageway therebetween. A heat exchanger is positioned in the second air passageway that rejects heat from the power circuit into a heat rejection stream of air passing through the second air passageway. Air is accelerated as streams in parallel and via the fan assembly as the core stream into the inner housing, as a bypass flow stream of air through the first volume, and as the heat rejection stream.

22 Claims, 5 Drawing Sheets

(56) References Cited

U.S. PATENT DOCUMENTS

| | | | |
|---|---|---|---|
| 5,373,698 A * | 12/1994 | Taylor | F01K 23/08 60/269 |
| 5,791,138 A * | 8/1998 | Lillibridge | F02C 7/045 60/262 |
| 6,134,880 A * | 10/2000 | Yoshinaka | F02C 7/143 60/226.1 |
| 6,269,624 B1 * | 8/2001 | Frutschi | F01K 21/047 60/39.52 |
| 7,089,743 B2 * | 8/2006 | Frutschi | F01K 21/042 60/39.52 |
| 8,132,412 B2 | 3/2012 | Bennett | |
| 8,281,593 B2 | 10/2012 | Held | |
| 8,397,506 B1 | 3/2013 | Wright et al. | |
| 8,464,534 B1 | 6/2013 | Riemer | |
| 8,479,516 B2 | 7/2013 | Carter | |
| 8,490,397 B2 | 7/2013 | Lehar | |
| 8,596,075 B2 | 12/2013 | Allam et al. | |
| 8,613,195 B2 | 12/2013 | Held et al. | |
| 8,616,001 B2 | 12/2013 | Held et al. | |
| 8,616,323 B1 | 12/2013 | Gurin | |
| 8,752,382 B2 | 6/2014 | Lehar | |
| 8,794,002 B2 | 8/2014 | Held et al. | |
| 8,813,497 B2 | 8/2014 | Hart et al. | |
| 8,814,981 B2 | 8/2014 | Stallmann | |
| 8,820,083 B2 | 9/2014 | Davidson et al. | |
| 8,857,186 B2 | 10/2014 | Held | |
| 8,869,531 B2 | 10/2014 | Held | |
| 8,887,503 B2 | 11/2014 | Sonwane et al. | |
| 8,959,887 B2 | 2/2015 | Allam et al. | |
| 8,966,901 B2 | 3/2015 | Held et al. | |
| 2007/0125063 A1 * | 6/2007 | Evulat | F02C 6/10 60/39.15 |
| 2011/0252796 A1 * | 10/2011 | Burkhart | F01K 27/00 60/641.2 |
| 2012/0067055 A1 | 3/2012 | Held | |
| 2012/0131920 A1 | 5/2012 | Held | |
| 2012/0144842 A1 * | 6/2012 | Snyder | F01D 25/12 60/785 |
| 2012/0186219 A1 | 7/2012 | Gurin | |
| 2013/0014511 A1 | 1/2013 | Gurin | |
| 2013/0104547 A1 | 5/2013 | Leduc | |
| 2013/0152576 A1 | 6/2013 | Mavuri et al. | |
| 2013/0180259 A1 * | 7/2013 | Stapp | F02C 3/04 60/773 |
| 2013/0239542 A1 | 9/2013 | Dasgupta et al. | |
| 2014/0023478 A1 | 1/2014 | Maeda et al. | |
| 2014/0060002 A1 | 3/2014 | Sonwane et al. | |
| 2014/0084595 A1 | 3/2014 | Davidson et al. | |
| 2014/0088773 A1 | 3/2014 | Davidson et al. | |
| 2014/0096524 A1 | 4/2014 | Held et al. | |
| 2014/0103661 A1 | 4/2014 | Kacludis et al. | |
| 2014/0119881 A1 | 5/2014 | Kalra et al. | |
| 2014/0208750 A1 | 7/2014 | Vermeersch et al. | |
| 2015/0033737 A1 | 2/2015 | Mitri et al. | |
| 2016/0010551 A1 * | 1/2016 | Allam | F02C 3/04 60/772 |

\* cited by examiner

GAS TURBINE ENGINE DRIVEN BY SCO2 CYCLE WITH ADVANCED HEAT REJECTION

CROSS-REFERENCE TO RELATED APPLICATIONS

This application is a non-provisional application claiming priority to U.S. Provisional Application No. 62/175,742 filed Jun. 15, 2015, which is hereby incorporated by reference in its entirety.

FIELD OF TECHNOLOGY

An improved apparatus and method of operating a gas turbine engine includes providing power to a shaft of the gas turbine engine using carbon dioxide ($CO_2$) operated in super-critical cycle.

BACKGROUND

It has become increasingly desirable to reduce the size of power-producing or thrust-producing devices such as gas turbine engines. Gas turbine engines typically include one or more shafts that include compressors, bypass fans, and turbines. Typically, air is forced into the engine and passed into a compressor. The compressed air is passed to a combustor, and at high temperature and pressure the combustion products are passed into a turbine. The turbine provides power to the shaft, which in turn provides the power to the compressor and bypass fan or gearbox. Thrust is thereby produced from the air that passes from the bypass fan, as well as from the expended in the turbine combustion products.

However, air can be thermodynamically inefficient, especially during cruise operation of the engine (such as in an aircraft). Air that enters the engine is of low pressure, therefore low density. In order to reach the needed pressure and temperature at the combustor exit, the air is compressed to very high pressure ratios and heated up to very high temperatures in the combustors. In order to provide adequate mass flow rate, significant volume flow rate of the low density air is pumped through high pressure ratio consuming significant amount of power. As a result the engines are made of large and heavy components, consume large amount to fuel, and may include significant operational and maintenance expenses to cope with high combustion temperatures.

To reduce component size and complexity, some power-producing or thrust-producing devices include a super-critical carbon dioxide (s-$CO_2$) system that provides significantly improved efficiencies compared to Brayton and other air-based systems by operating in a super-critical region (operating at a temperature and pressure that exceed the critical point). That is, a phase-diagram of $CO_2$, as is commonly known, includes a "triple point" as the point that defines the temperature and pressure where solid, liquid, and vapor meet. Above the triple point the fluid can exist in liquid, vapor, or in a mixture of the both states. However, at higher temperature and pressure, a critical point is reached which defines a temperature and pressure where gas, liquid, and a super-critical region occur. The critical point is the top of the dome made up of the saturated liquid and saturated vapor lines. Above the critical point is the gaseous region.

Fluids have a triple point, a critical point, saturated liquid and vapor lines, and a super-critical region. One in particular, carbon dioxide, is particularly attractive for such operation due to its critical temperature and pressure of approximately 31° C. and 73 atmospheres, respectively, as well as due to its lack of toxicity. Thus, s-$CO_2$-based systems may be operated having very dense super-critical properties, such as approximately 460 kg/m$^3$. The excellent combination of the thermodynamic properties of carbon dioxide may result in improved overall thermodynamic efficiency and therefore a tremendously reduced system size. Due to the compact nature and high power density of a power source that is powered with a super-critical cycle, the overall size of engine may be significantly reduced, as well.

A super-critical fluid occurs at temperatures and pressures above the critical point, where distinct liquid and gas phases do not exist. Close to the critical point and in the super-critical region, the combination of thermodynamic and transport properties of $CO_2$ provide a tremendous opportunity for high power energy extraction and in a small footprint relative to, for instance, an air-based thermodynamic system (such as a Brayton cycle).

However, because of their reduced size there is a significantly increased power density when compared to more traditional power systems. As such, there is a need to provide improved cooling and heat rejection in power-producing devices that employ a s-$CO_2$ operation.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine is described herein, and various embodiments thereof. According to the disclosure, a gas turbine engine uses a power source to provide power to the shaft, reducing the pressure ratio while providing adequate power and thrust for aircraft and other purposes.

Various applications include, as examples, a turbojet, a turbofan, adaptable, turboprop and turboshaft engine configurations. The turbojet derives most of its thrust from the core stream and is generally most advantageous in high altitude and/or high mach regimes. Turbojets bypass minimal airflow around the core so they tend to be smaller diameter, noisy and drag efficient. The turbofan, on the other hand, derives most of its thrust from the bypass stream which offers advantages in fuel savings mostly in subsonic applications. Turbofans bypass a high amount of airflow around the core and appear larger in diameter. Because of the larger fan turning more slowly they produce less noise than a turbojet.

A variant of the above turbine technologies is another potential application. An adaptable engine, capable of varying the core/bypass split should also be included in the application of s-$CO_2$. Varying the bypass ratio might be accomplished by varying duct areas at inlets or exits to the core and bypass streams. An application such as this allows for both turbojet and turbofan operation so that fuel consumption can be minimized in both subsonic and supersonic regimes.

Turboprop engines characteristically attach a turbine engine to drive a propeller instead of a fan. Because propellers typically turn more slowly because of their larger diameter, a gearbox may be provided between the turbine engine and the propeller. In a turboshaft application, the turbine connects to something other than a fan or propeller, often a helicopter rotor or shaft in a marine application. Turboshafts typically include a gearbox between the turbine engine and rotor or shaft.

Figure 1:
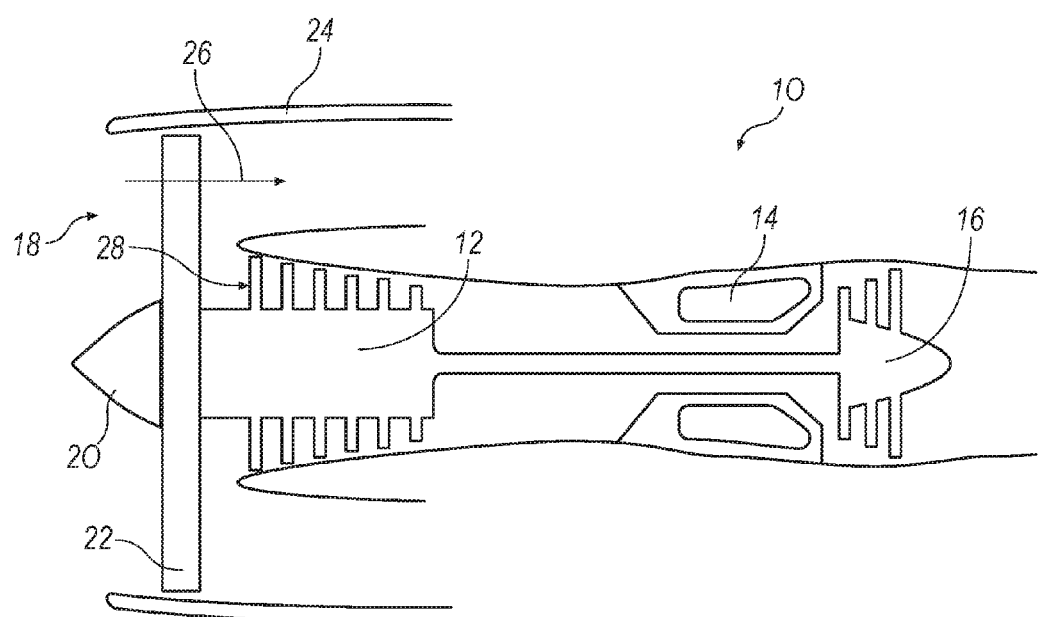
FIG. 1 is an illustration of a conventional gas turbine engine.

FIG. 1 illustrates an exemplary schematic diagram of a gas turbine machine 10 that is a primary mover or thrust source for an aircraft. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. The engine provides two major functions: propulsion and power generation used to rotate the compressors, turbines, and the bypass fan. The major function, propulsion, includes fairly low air pressures and temperatures, which are approximately equal to the pressures and temperatures exiting the gas turbine engine. However, the air pressure ratios and temperatures generated in the gas turbine engine are relatively very high. The high pressure ratios and temperatures are needed to provide the power generation function. In one known example, an engine has a pressure of 180 psia and a temperature of 1600° F. at the combustor exit and pressure of 25 psia and temperature of 1000° F. at the last turbine exit provided that the pressure at the engine inlet is 15 psia on the ground. This means that the propulsion requires pressure ratio of 25/15=1.67, when the total pressure ratio in the engine is 180/15=12 covers power for both propulsion and power generation devices. In some known engines the difference in pressure ratios and combustion temperatures may be even greater.

Figure 2:
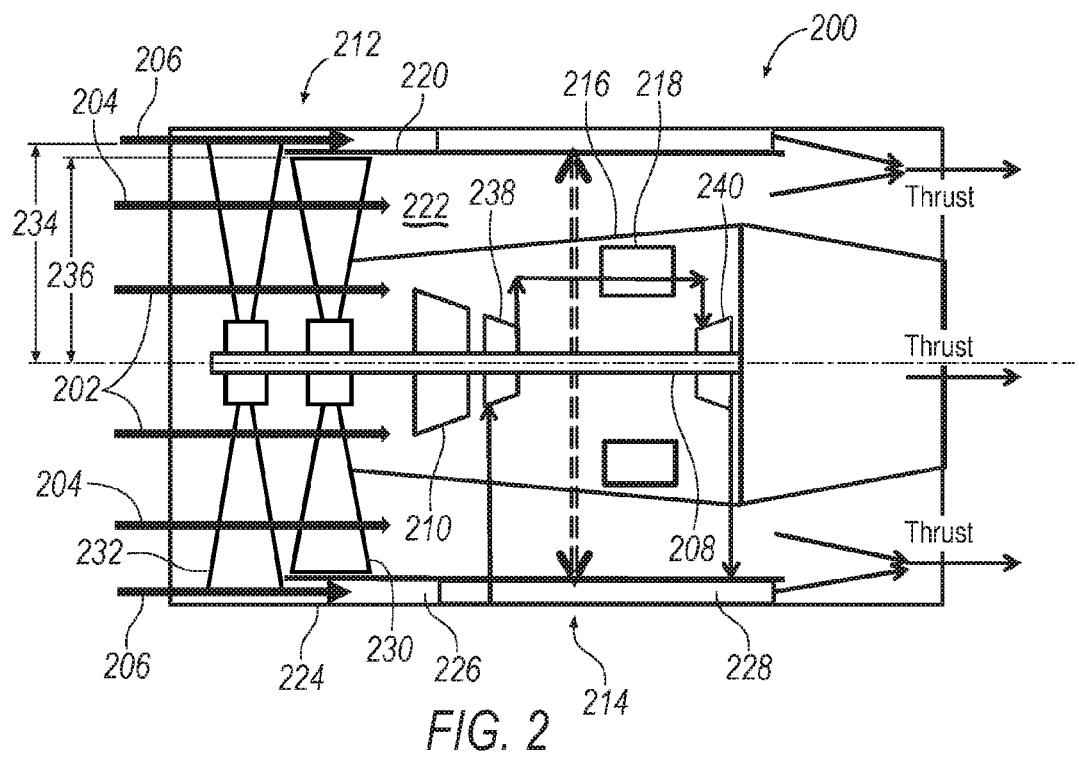
FIG. 2 is an illustration of an exemplary turbofan having a power circuit.

FIG. 2 is an illustration of a turbofan 200 according to one example. Turbofan 200 generates three streams: a core stream of air 202; a secondary or bypass air stream 204; and an airstream for heat rejection 206. Turbofan 200 includes a shaft 208 that includes a first compressor 210, a fan assembly 212, and a power circuit 214 that provides power to shaft 208 in a closed-loop system. A closed-loop system in this regard refers to a power-producing circuit that includes its own working fluid, such as a s-$CO_2$ system, and which operates in compression, thermal power input, expansion, and heat rejection in a closed-loop analogous to a closed-loop power generation system. That is, aside from incidental leakage of the working fluid, the working fluid does not otherwise contact the external environment during operation. An inner housing 216 houses at least a portion of shaft 208, compressor 210 for compressing core stream of air 202, and a combustor 218. A baffle 220 encloses a portion of inner housing 216 and forms an air passageway 222 therebetween. A nacelle 224 encloses a portion of baffle 220 and forms an air passageway 226 therebetween. A heat exchanger 228 is positioned in air passageway 226 that rejects heat from power circuit 214 into heat rejection stream of air 206 passing through air passageway 226. Air is accelerated as streams 202, 204, 206 in parallel and via fan assembly 212.

Fan assembly 212 includes two fans 230, 232 positioned in series along shaft 208. That is, first fan 230 and second fan 232 of fan assembly 212 accelerate core stream 202 and bypass flow stream 204, and first fan 230 accelerates heat rejection stream 206. Second fan 232 includes a fan blade radius 234 that is greater than that 236 of first fan 230. Power circuit 214 includes carbon dioxide as a working fluid and is configured to operate as a super-critical (s-$CO_2$) system. Power circuit 214 includes a second compressor 238 coupled to shaft 208 for compressing the working fluid, and a turbine 240 coupled to shaft 208 for expanding the working fluid to extract the power therefrom. In operation, combustor 218 provides power input to the working fluid of power circuit 214, which in turn is expanded (and energy extracted therefrom) by turbine 240, before heat is rejected in heat rejection heat exchanger 228. The working fluid is compressed in second compressor 238 before entering combustor 218.

One embodiment excludes first compressor 210. In this case fan assembly 212 covers functions of that compressor.

Figure 3:
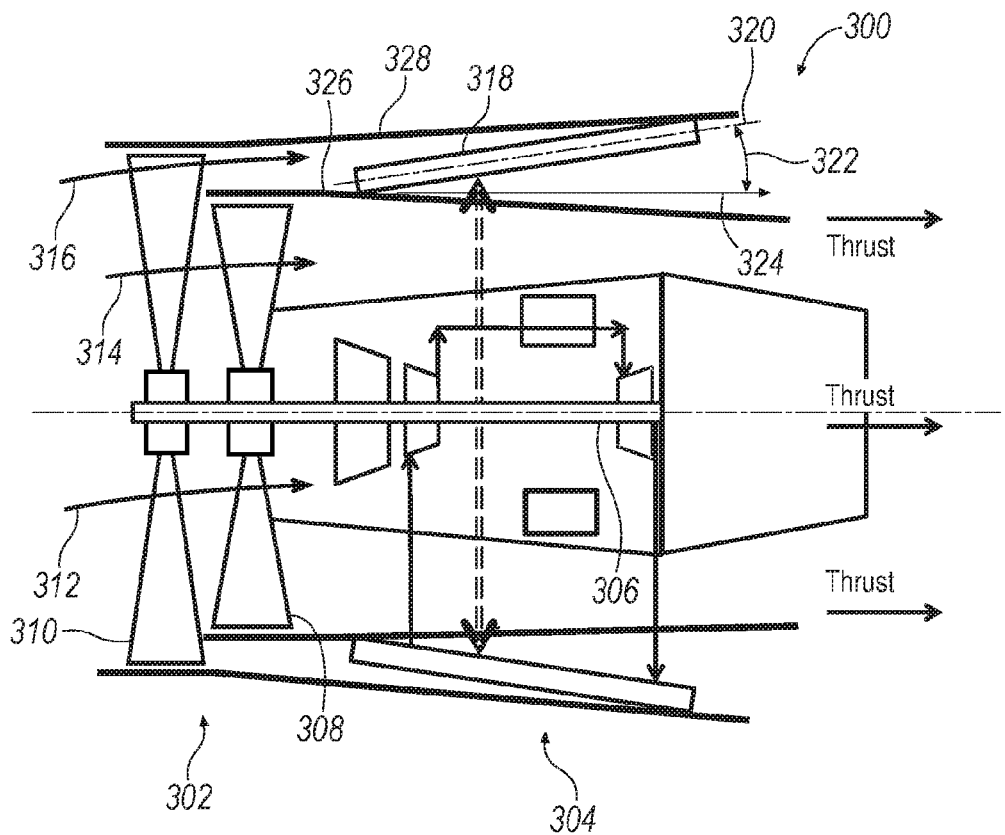
FIG. 3 is an illustration of an exemplary turbofan having heat rejection heat exchangers at an angle with respect to a cooling stream of air.

FIG. 3 is an illustration of a turbofan 300 according to another example. Turbofan 300 operates comparably to turbofan 200 of FIG. 2, having a fan assembly 302 and a power circuit 304 that provides power to a shaft 306, and is configured to operate as a s-$CO_2$ system. Fan assembly 302 includes a first fan 308 and a second fan 310, and fan assembly 302 accelerates three air streams: a core stream of air 312; a secondary or bypass air stream 314; and an airstream for heat rejection 316. A heat rejection heat exchanger 318 is positioned within heat rejection airstream 316. However, in comparison to turbofan 200 of FIG. 2, heat exchanger 318 is positioned having an extended axis 320 at an acute angle 322 with respect to a direction 324 of heat rejection stream 316 and between a baffle 326 and a nacelle 328. Accordingly, the face area of heat exchanger 318 may be increased and the depth of heat exchanger 318 may be decreased. These may substantially reduce the air side pressure drop across the heat exchanger 318 and the drag that occurs as the air passes through heat exchanger 318.

Figure 4:
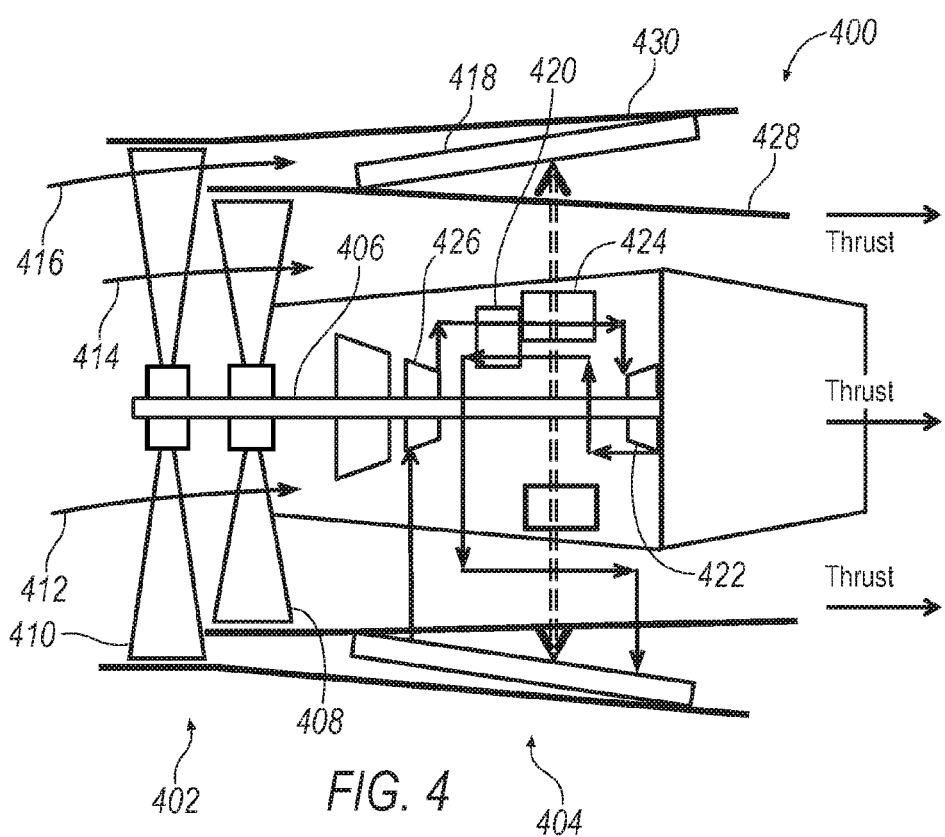
FIG. 4 is an illustration of an exemplary turbofan having a recuperative heat exchanger in a power circuit.

FIG. 4 is an illustration of a turbofan 400 according to another example. Turbofan 400 operates comparably to turbofan 300 of FIG. 3, having a fan assembly 402 and a power circuit 404 that provides power to a shaft 406, and is configured to operate as a s-$CO_2$ system. Fan assembly 402 includes a first fan 408 and a second fan 410, and fan assembly 402 accelerates three air streams: a core stream of air 412; a secondary or bypass air stream 414; and an airstream for heat rejection 416. A heat rejection heat exchanger 418 is positioned within heat rejection airstream 416 and between a baffle 428 and a nacelle 430, and also at an acute angle with respect to airstream 416 passing therethrough, resulting in reduced face area of heat exchanger 418, increased its depth, and reduced drag.

Power circuit 404 includes a recuperative heat exchanger 420 that exchanges heat from the working fluid after it exits a turbine 422 to the working fluid and before it enters a combustor 424. Recuperative heat exchanger 420 improves overall thermodynamic efficiency of power circuit 404, in that the working fluid from a compressor 426 (of power circuit 404) is cooled before it enters combustor 424, and the working fluid is also heated as it passes from turbine 422 before reaching heat rejection heat exchanger 418.

Figure 5:
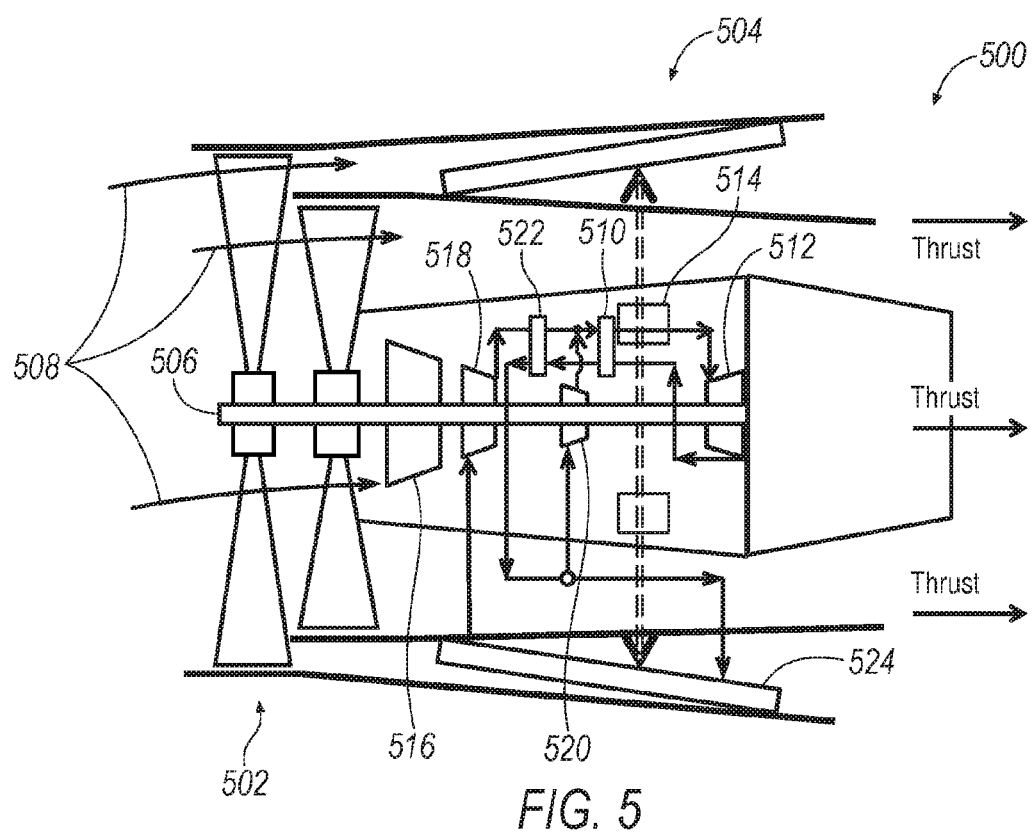
FIG. 5 is an illustration of an exemplary turbofan having two recuperative heat in a power circuit.

FIG. 5 is an illustration of a turbofan 500 according to another example. Turbofan 500 operates comparably to turbofan 400 of FIG. 4, having a fan assembly 502 and a power circuit 504 that provides power to a shaft 506, and is configured to operate as a s-$CO_2$ system. Fan assembly 502 includes two fans as illustrated, and fan assembly 502 accelerates three air streams 508 that include a core stream of air; a secondary or bypass air stream; and an airstream for heat rejection. A heat rejection heat exchanger is positioned within the heat rejection airstream and between a baffle and a nacelle (as described previously), and also at an acute angle with respect to the airstream passing therethrough, resulting in reduced face area of heat exchanger 418, increased its depth, and reduced drag.

Power circuit 504 includes the following components in the closed loop: a compressor 518, a recuperative heat exchanger 522, a recuperative heat exchanger 510, a combustor 514, turbine 512, and a heat rejection exchanger 524. A compressor 520 is installed in parallel to compressor 518 in respect to operating pressures: compressor 518 compresses refrigerant stream from the state at the heat rejection exchanger exit to the state at the recuperative heat exchanger 522 inlet and compressor 520 compresses refrigerant stream from the state at the heat rejection exchanger inlet to the state at the recuperative heat exchanger 522 exit. Thus, this embodiment implies the compression in two parallel compressors 518 and 520 (versus the compression in compressor 426 only of FIG. 4) and the heat recuperation in two recuperative heat exchangers 522 and 510 connected in series (versus the heat recuperation in one recuperative heat exchanger 420 of FIG. 4). Recuperative heat exchanger 522 exchanges heat from the working fluid at high pressure after it exits compressor 518 to the working fluid exiting recuperative heat exchanger 510 at low pressure. Recuperative heat exchanger 510 exchanges heat from the working fluid after it exits a turbine 512 to the working fluid exiting recuperative heat exchanger 510 at high pressure before the high pressure refrigerant enters a combustor 514.

Turbofan 500 includes an air compressor 516 coupled to shaft 506 that compresses the core stream of air passing therethrough.

The s-$CO_2$ is called recompression cycle and the published studies shows that it provides a higher thermodynamic efficiency than the basic s-$CO_2$ cycle shown on FIG. 4.

Figure 6:
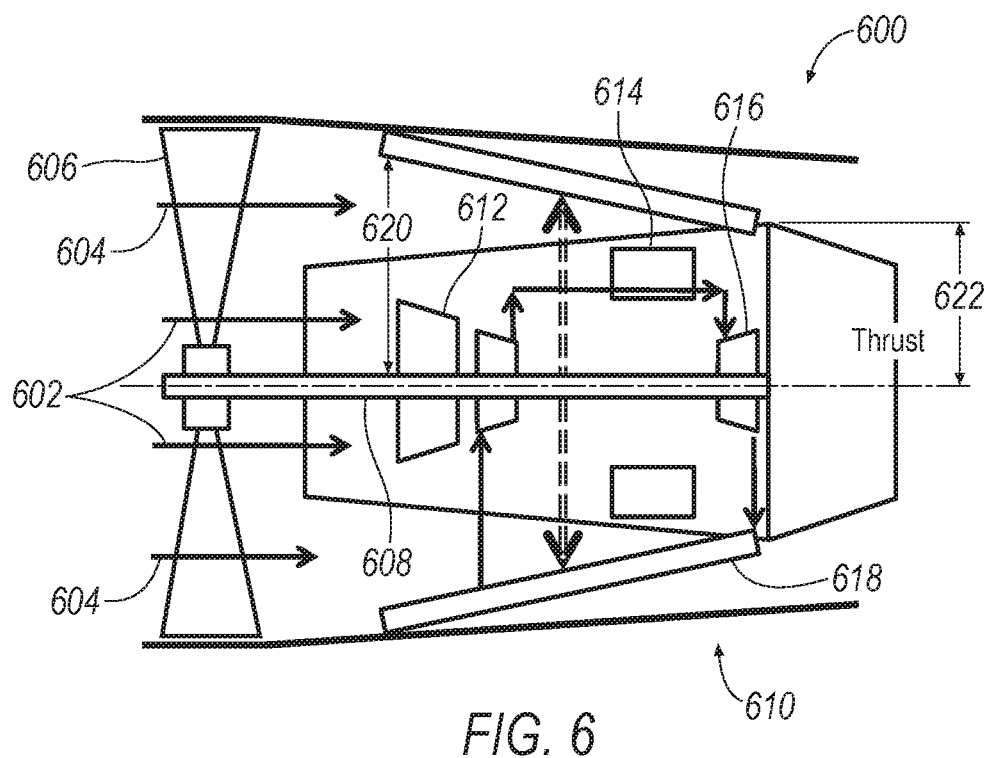
FIG. 6 is an illustration of a turbojet, according to one example.

FIG. 6 is an illustration of a turbojet 600, according to one example. Turbojet 600 includes a core stream of air 602 and a heat rejection stream of air 604. Turbojet 600 includes a fan 606 coupled to a shaft 608. Fan 606 provides core stream of air 602 for thrust, as well as heat rejection stream of air 604 for heat rejection for a power circuit 610. An air compressor 612 compresses core stream of air 602 prior to combustion in a combustor 612. Combustor 614 provides power to a working fluid within power circuit 610, before expansion of the working fluid in a turbine 616, and then heat rejection in a heat rejection heat exchanger 618. As with previous examples, power circuit 610 is configured to operate as a s-$CO_2$ system.

Heat rejection heat exchanger 618 is positioned such that, along a length of flow of heat rejection stream of air 604, a radial position of heat rejection heat exchanger 618 is reduced. That is, heat rejection heat exchanger 618 is at a first radial length 620 that is reduced along its length to a second radial position length 622. Accordingly, as heat rejection stream of air 604 passes through heat rejection heat exchanger 618, because of a resulting angle of heat rejection heat exchanger 618 with respect to heat rejection stream of air 604, drag is improved, compared to an arrangement in which heat rejection heat exchanger 618 is approximately parallel with heat rejection stream of air 604.

Figure 7:
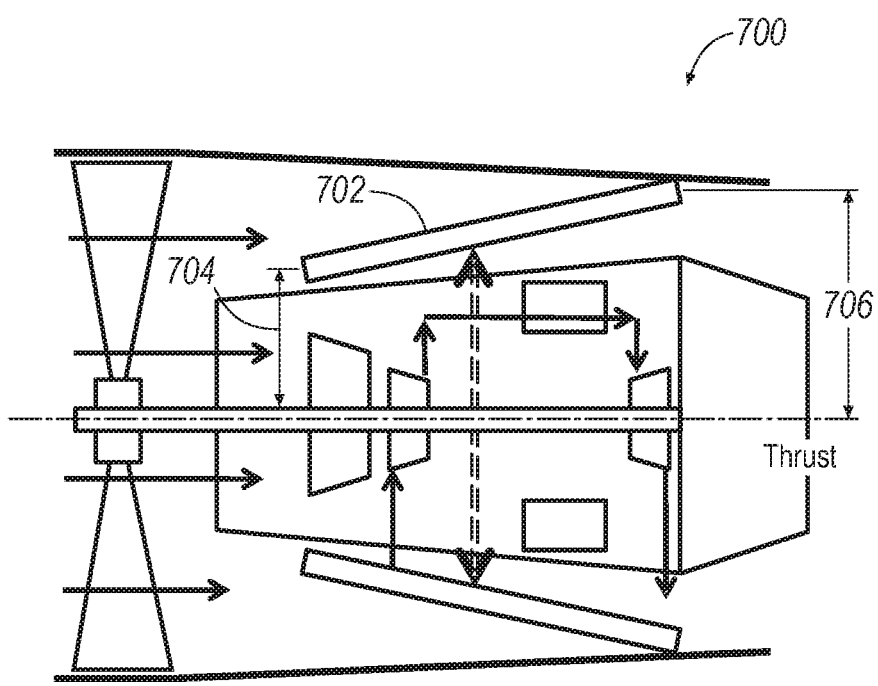
FIG. 7 is an illustration of a turbojet, according to one example.

Referring to FIG. 7, a turbojet 700 includes similar exemplary features as illustrated in FIG. 6. However, in this example, turbojet 700 includes a heat rejection heat exchanger 702 that fans in an opposite direction to that of turbojet 600 of FIG. 6. In this example, heat rejection heat exchanger 702 includes one end at a radial position 704 that is less than a radial position 706. Accordingly, as heat rejection stream of air passes through heat rejection heat exchanger 702, because of a resulting angle of heat rejection heat exchanger 702 with respect to the heat rejection stream of air passing therethrough, drag is improved, compared to an arrangement in which heat rejection heat exchanger 702 is approximately parallel with heat rejection stream of air.

Figure 8:
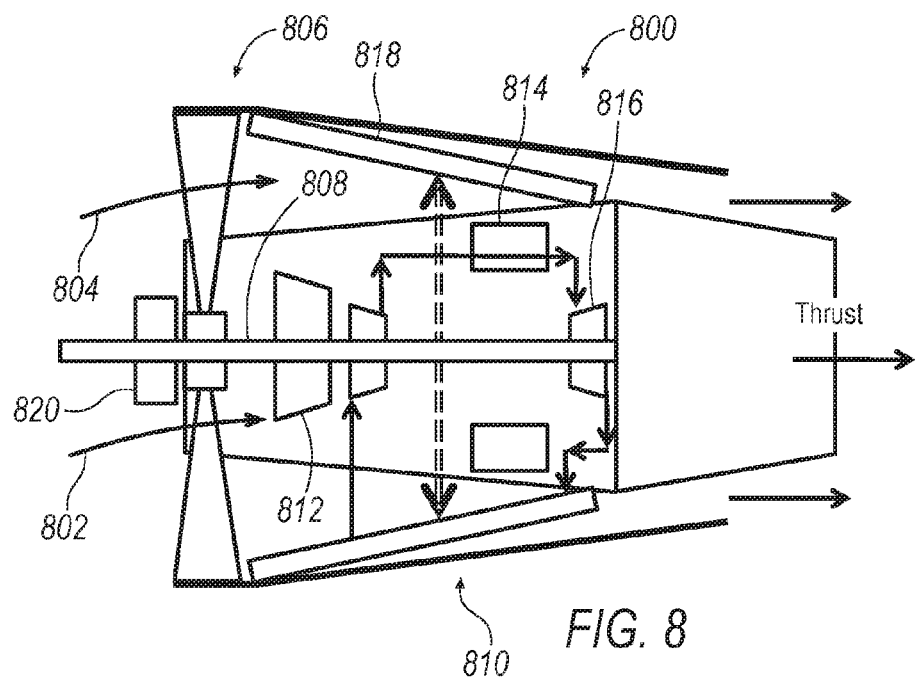
FIG. 8 is an illustration of a turboshaft, according to one example.

FIG. 8 is an illustration of a turboshaft 800, according to one example. A turboshaft is a form of a gas turbine engine which is optimized to produce shaft power rather than jet thrust.

Turboshaft 800 includes a core stream of air 802 and a heat rejection stream of air 804. Turboshaft 800 includes a propeller or fan 806 coupled to a shaft 808. Fan 806 provides stream of air 804 for heat rejection only. An air compressor 812 compresses core stream of air 802 prior to combustion in a combustor 812. Combustor 814 provides power to a working fluid within power circuit 810, before expansion of the working fluid in a turbine 816, and then heat rejection in a heat rejection heat exchanger 818. As with previous examples, power circuit 810 is configured to operate as a s-$CO_2$ system.

Part of the power generated by turbine 816 is transferred via shaft 808 and a gear box 820 as a power-producing device to drive a user's rotating machine.

As illustrated, heat rejection heat exchanger 818 is positioned such that, along a length of flow of heat rejection stream of air 804, a radial position of heat rejection heat exchanger 818 is reduced. That is, as discussed with respect to FIG. 6, heat rejection heat exchanger 818 is at a first radial length that is reduced along its length to a second radial position length. Accordingly, as heat rejection stream of air 804 passes through heat rejection heat exchanger 818, because of a resulting angle of heat rejection heat exchanger 818 with respect to heat rejection stream of air 804, drag is improved, compared to an arrangement in which heat rejection heat exchanger 818 is approximately parallel with heat rejection stream of air 804.

Figure 9:
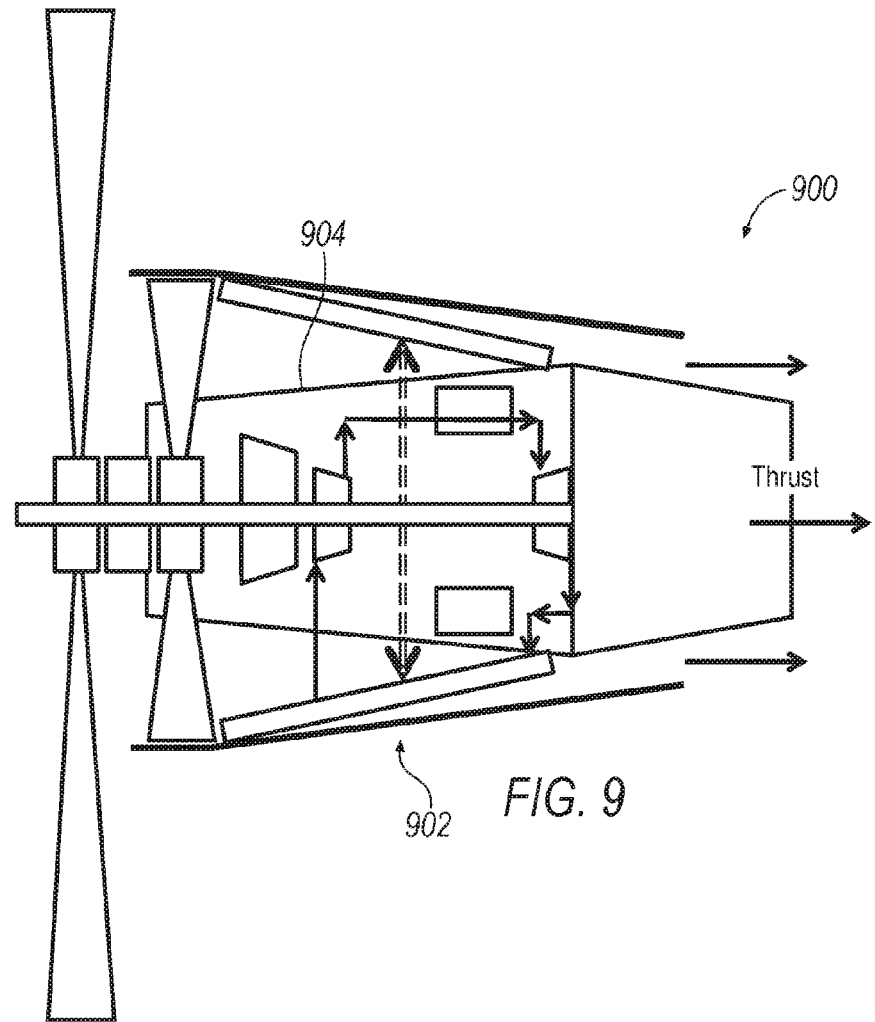
FIG. 9 is an illustration of a turboprop, according to one example.

FIG. 9 is an illustration of a turboprop 900, according to one example. A turboprop is a turbine engine which drives an aircraft propeller.

As with the previous examples, turboprop 900 includes a power circuit 902 that is configured to operate as a s-$CO_2$ system. A core stream of air passes through a center of turboprop 900, and a heat rejection stream of air passes external to a housing 904 to provide heat rejection for power circuit 902.

Part of the power generated by the turbine is transferred via the shaft and the gear box to rotate an aircraft propeller.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A gas turbine engine, comprising:
   a shaft having mounted thereto a first compressor, a second compressor, a turbine, and a fan assembly;
   a power circuit that provides power to the shaft in a closed-loop system that includes a working fluid heated by a combustor, the power circuit comprising the turbine and the second compressor;
   an inner housing that houses:
     at least a portion of the shaft;
     the second compressor;
     the turbine;
     the first compressor for compressing a core stream of air; and
     the combustor to heat the working fluid when it enters the combustor;
   a baffle that encloses a portion of the inner housing and forms a first air passageway therebetween;
   a nacelle that encloses a portion of the baffle and forms a second air passageway therebetween; and
   a heat exchanger positioned in the second air passageway that rejects heat from the working fluid into a heat rejection stream of air passing through the second air passageway;
   wherein air is accelerated as streams in parallel and via the fan assembly:
     as the core stream into the inner housing;
     as a bypass flow stream of air through a first volume; and
     as the heat rejection stream.

2. The gas turbine engine of claim 1, wherein:
   the fan assembly includes a first fan and a second fan positioned in series along the shaft and mounted thereto, and mounted concentrically with respect to the turbine and the second compressor;
   the first and the second fans of the fan assembly accelerate the core stream and the bypass flow stream; and
   the first fan accelerates the heat rejection stream.

3. The gas turbine engine of claim 2, wherein the first fan includes a fan blade radius that is greater than that of the second fan.

4. The gas turbine engine of claim 1, wherein the power circuit includes carbon dioxide as at least a portion of the working fluid and is configured to operate as a super-critical (s-$CO_2$) system.

5. The gas turbine engine of claim 4, wherein the power circuit includes the second compressor mounted to the shaft for compressing the working fluid, and the turbine mounted to the shaft for expanding the working fluid to extract power therefrom.

6. The gas turbine engine of claim 5, wherein the power circuit includes a first recuperative heat exchanger that exchanges heat from the working fluid after it exits the turbine to the working fluid before it enters the combustor.

7. The gas turbine engine of claim 6, further comprising a second recuperative heat exchanger and a third compressor coupled to the shaft that compresses the working fluid before it enters the second recuperative heat exchanger.

8. The gas turbine engine of claim 1, wherein the heat exchanger is positioned having an extended axis at an acute angle with respect to a direction of the heat rejection stream.

9. The gas turbine engine of claim 1, wherein the bypass flow stream of air and the heat rejection stream rejoin prior to an exit location of the core stream of air from the gas turbine engine.

10. A method of powering a gas turbine engine, comprising:
    accelerating air as streams in parallel and via a fan assembly, the streams comprising:
      a core stream;
      a bypass flow stream; and
      a heat rejection stream;
    passing the core stream into an inner housing that houses:
      at least a portion of a shaft, the shaft having mounted thereto a first compressor, a second compressor, a turbine, and the fan assembly;
      the second compressor;
      the turbine;
      the first compressor for compressing the core stream; and
      a combustor that provides a power input directly to a working fluid of a power circuit in a closed-loop arrangement by heating the working fluid;
    passing the bypass flow stream external to the inner housing and into a first air passageway that is formed between a baffle and the inner housing;
    passing the heat rejection stream through a heat exchanger that is positioned in a second air passageway that is formed by a nacelle, that encloses at least a portion of the baffle;
    providing power to the shaft via the working fluid of the power circuit; and
    cooling the working fluid in the heat rejection stream with the heat exchanger;
    wherein the power circuit includes the turbine and the second compressor.

11. The method of claim 10, wherein:
    the fan assembly includes a first fan and a second fan positioned in series along the shaft and mounted thereto, and mounted concentrically with respect to the turbine and the second compressor;
    the first and the second fans of the fan assembly accelerate the core stream and the bypass flow stream; and
    the first fan accelerates the heat rejection stream.

12. The method of claim 11, wherein the first fan includes a fan blade radius that is greater than that of the second fan.

13. The method of claim 10, wherein the power circuit includes carbon dioxide as at least a portion of the working fluid, further comprising operating the power circuit as a super-critical (s-$CO_2$) system.

14. The method of claim 13, wherein the power circuit includes the second compressor mounted to the shaft for compressing the working fluid, and the turbine mounted to the shaft for expanding the working fluid to extract the power therefrom.

15. The method of claim 14, wherein the power circuit includes a first recuperative heat exchanger that exchanges heat from the working fluid after it exits the turbine to the working fluid before it enters the combustor.

16. The method of claim 15, further comprising a second recuperative heat exchanger and a third compressor coupled to the shaft that compresses the working fluid before it enters the second recuperative heat exchanger.

17. The method of claim 10, wherein the heat exchanger is positioned having an extended axis at an acute angle with respect to a direction of the heat rejection stream.

18. The method of claim 10, further comprising joining the bypass flow stream with the heat rejection stream within the gas turbine engine, and at an axial location upstream of where the core stream exits the gas turbine engine.

19. A power-producing device, comprising:
an inner housing for passing a core stream of air, the inner housing houses:
at least a portion of a shaft having mounted thereto a first compressor, a second compressor, a turbine, and a fan assembly;
the second compressor;
the turbine;
the first compressor for compressing a core stream of air; and
a combustor that receives a working fluid of a power circuit and provides a power input to the working fluid, the power circuit comprising the turbine and the second compressor;
a nacelle that encloses a portion of the inner housing and forms a first air passageway therebetween for passing a heat rejection stream of air; and
a heat exchanger positioned in the first air passageway that rejects heat from the power circuit into a heat rejection stream of air passing through the second air passageway;
wherein the core stream and the heat rejection stream are accelerated in parallel and via the fan assembly; and
wherein the power circuit includes carbon dioxide as at least a portion of the working fluid and is configured to operate as a super-critical ($s\text{-}CO_2$) system.

20. The power-producing device of claim 19, wherein:
the fan assembly includes a first fan and a second fan positioned in series along the shaft and mounted thereto, and mounted concentrically with respect to the turbine and the second compressor;
the first and the second fans of the fan assembly accelerate the core stream and the heat rejection stream; and
the first fan accelerates the heat rejection stream.

21. The power-producing device of claim 19, wherein the shaft includes a gear box as a power-producing device and a propeller for providing thrust.

22. The power-producing device of claim 19, wherein the power circuit includes the second compressor mounted to the shaft for compressing the working fluid, and the turbine mounted to the shaft for expanding the working fluid to extract the power therefrom.

* * * * *